US012615202B2

(12) United States Patent
Singh et al.

(10) Patent No.: US 12,615,202 B2
(45) Date of Patent: Apr. 28, 2026

(54) PACKET ROUTING IN DISAGGREGATED SCHEDULED FABRICS

(71) Applicant: Cisco Technology, Inc., San Jose, CA (US)

(72) Inventors: Tapraj Singh, San Ramon, CA (US); Praveen Bhagwatula, San Jose, CA (US); Satya Ranjan Mohanty, San Ramon, CA (US); Masiuddin Mohammed, Fremont, CA (US); Bhavani Prasad Parise, Fremont, CA (US); Srinivas V. Garigipati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/771,967

(22) Filed: Jul. 12, 2024

(65) Prior Publication Data

US 2025/0274378 A1     Aug. 28, 2025

Related U.S. Application Data

(60) Provisional application No. 63/558,561, filed on Feb. 27, 2024.

(51) Int. Cl.
*H04L 45/02*       (2022.01)
*H04L 45/03*       (2022.01)
*H04L 45/745*      (2022.01)

(52) U.S. Cl.
CPC .............. *H04L 45/04* (2013.01); *H04L 45/03* (2022.05); *H04L 45/745* (2013.01)

(58) Field of Classification Search
CPC ........ H04L 45/04; H04L 45/03; H04L 45/745
See application file for complete search history.

(56) References Cited

U.S. PATENT DOCUMENTS 11,025,536 B1      6/2021   Venkataramanan et al.
2011/0286452 A1   11/2011   Balus et al.
(Continued)

FOREIGN PATENT DOCUMENTS

CN      109412949 A      3/2019
WO      2015024388 A1    2/2015

OTHER PUBLICATIONS

BGP Confederations for IBGP Scaling, Juniper Networks, Dec. 14, 2023.

*Primary Examiner* — Azizul Choudhury
(74) *Attorney, Agent, or Firm* — Rutan & Tucker, LLP; Ravi Mohan; Marc A. McClain

(57)       ABSTRACT

Devices, networks, systems, methods, and processes for packet forwarding and routing are described herein. A network device may be connected to a host device. The network device can identify an interface associated with the host device and determine an operational status of the interface. The network device can determine a host route and assign an encapsulation index associated with the host route. The network device may generate an update message based on the operational status and the encapsulation index. The network device can transmit the update message to one or more other network devices. The network device can also update one or more routing or forwarding tables to include routing information associated with the host device. The other network devices can extract the routing information from the update message and may utilize the routing information to route or forward one or more data packets addressed to the host device.

20 Claims, 8 Drawing Sheets

(56)        References Cited

U.S. PATENT DOCUMENTS

| | | | |
|---|---|---|---|
| 2015/0138958 A1* | 5/2015 | Shao | H04L 45/28 |
| | | | 370/228 |
| 2016/0014025 A1 | 1/2016 | Wang | |
| 2018/0077047 A1 | 3/2018 | Srinivasan et al. | |
| 2018/0123828 A1* | 5/2018 | Zhang | H04L 49/3009 |
| 2020/0036577 A1* | 1/2020 | Bhagvath | H04L 45/28 |
| 2021/0211323 A1 | 7/2021 | Patel et al. | |
| 2022/0303366 A1 | 9/2022 | Brissette et al. | |
| 2023/0090204 A1* | 3/2023 | Chen | H04L 45/24 |
| | | | 370/392 |
| 2024/0179089 A1* | 5/2024 | Cirkovic | H04L 45/748 |

* cited by examiner

*FIG. 5*

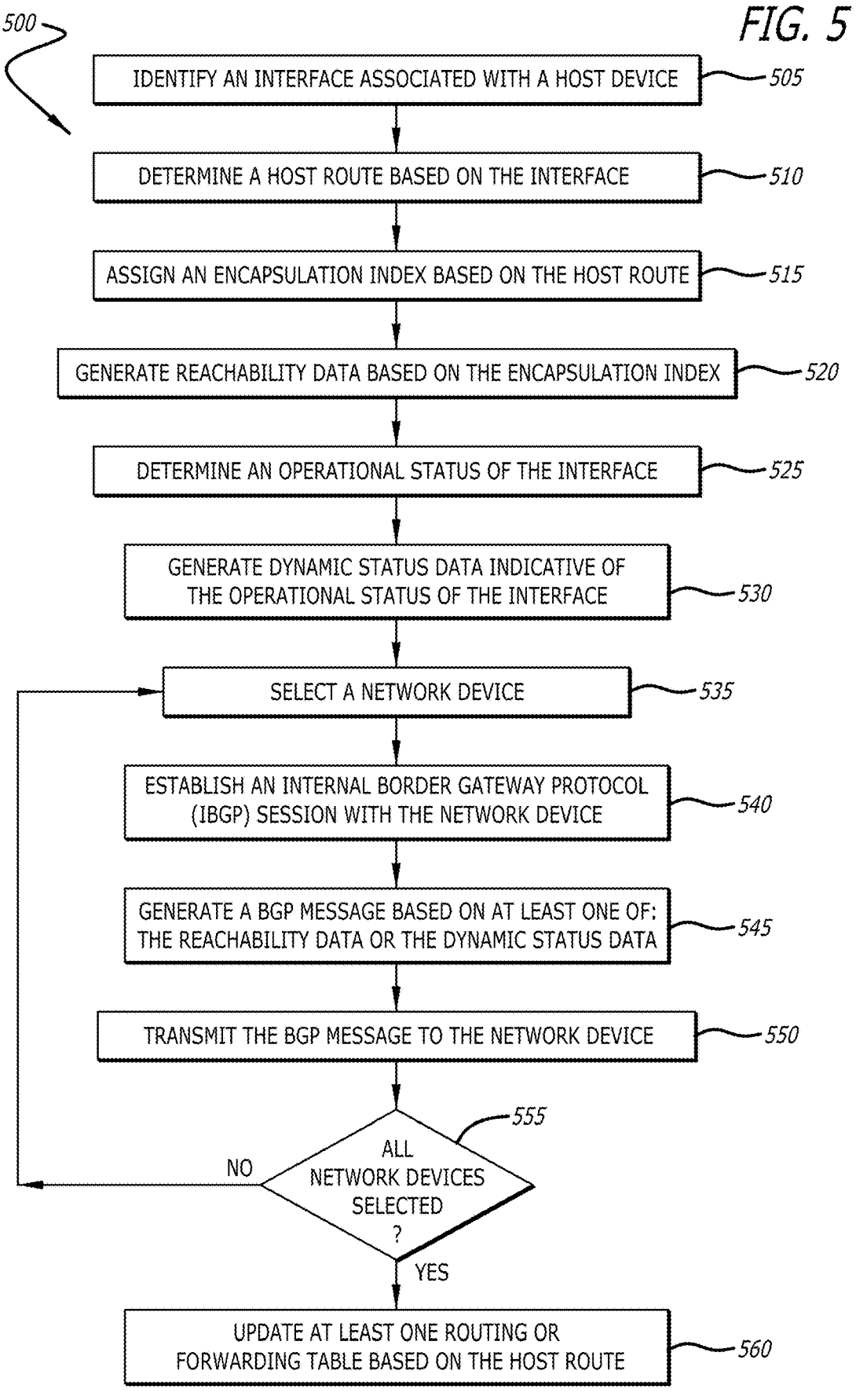

500

IDENTIFY AN INTERFACE ASSOCIATED WITH A HOST DEVICE —505

DETERMINE A HOST ROUTE BASED ON THE INTERFACE —510

ASSIGN AN ENCAPSULATION INDEX BASED ON THE HOST ROUTE —515

GENERATE REACHABILITY DATA BASED ON THE ENCAPSULATION INDEX —520

DETERMINE AN OPERATIONAL STATUS OF THE INTERFACE —525

GENERATE DYNAMIC STATUS DATA INDICATIVE OF THE OPERATIONAL STATUS OF THE INTERFACE —530

SELECT A NETWORK DEVICE —535

ESTABLISH AN INTERNAL BORDER GATEWAY PROTOCOL (IBGP) SESSION WITH THE NETWORK DEVICE —540

GENERATE A BGP MESSAGE BASED ON AT LEAST ONE OF: THE REACHABILITY DATA OR THE DYNAMIC STATUS DATA —545

TRANSMIT THE BGP MESSAGE TO THE NETWORK DEVICE —550

555

ALL NETWORK DEVICES SELECTED ?

NO

YES

UPDATE AT LEAST ONE ROUTING OR FORWARDING TABLE BASED ON THE HOST ROUTE —560

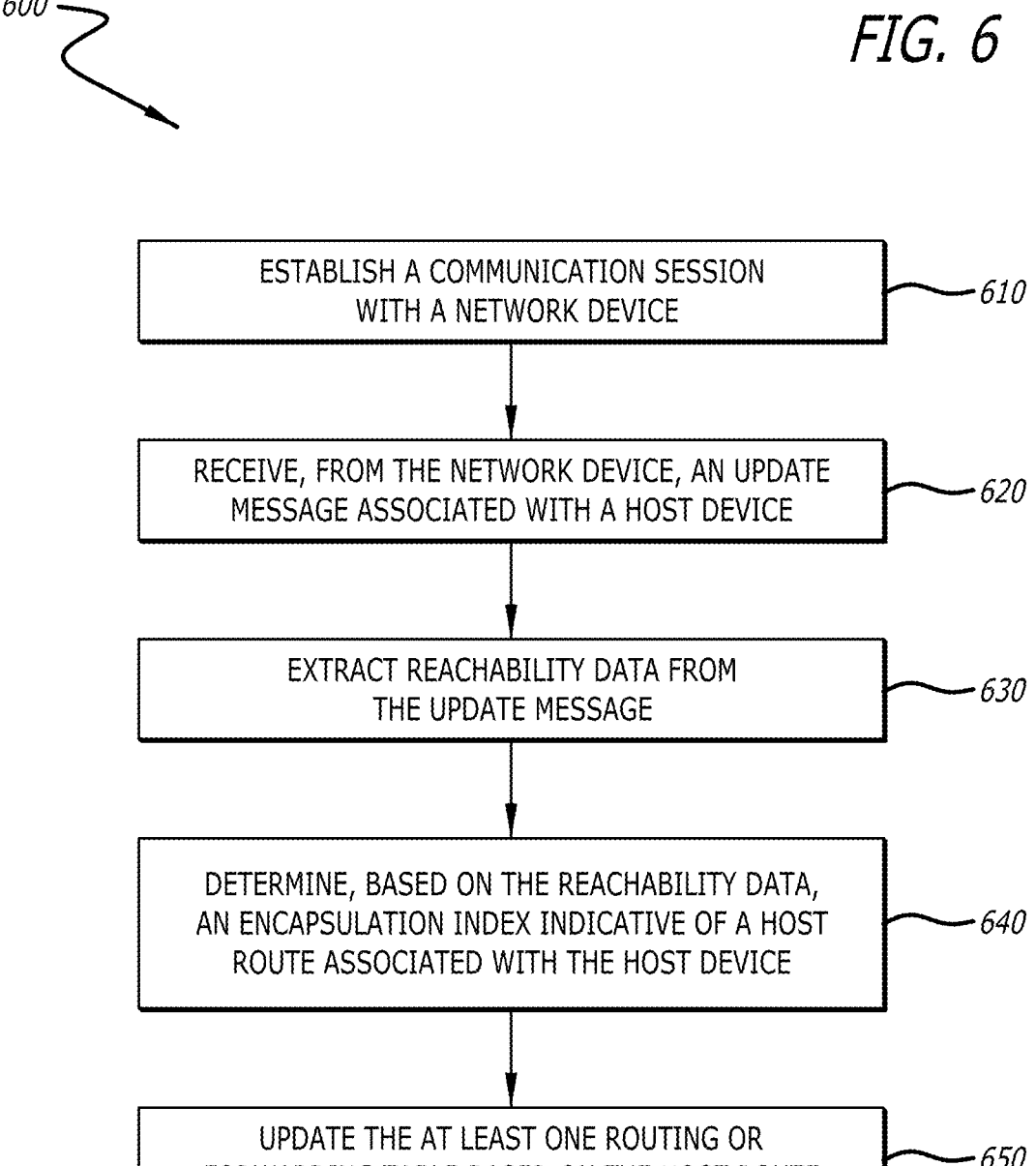

ESTABLISH A COMMUNICATION SESSION
WITH A NETWORK DEVICE — 610

RECEIVE, FROM THE NETWORK DEVICE, AN UPDATE
MESSAGE ASSOCIATED WITH A HOST DEVICE — 620

EXTRACT REACHABILITY DATA FROM
THE UPDATE MESSAGE — 630

DETERMINE, BASED ON THE REACHABILITY DATA,
AN ENCAPSULATION INDEX INDICATIVE OF A HOST
ROUTE ASSOCIATED WITH THE HOST DEVICE — 640

UPDATE THE AT LEAST ONE ROUTING OR
FORWARDING TABLE BASED ON THE HOST ROUTE — 650

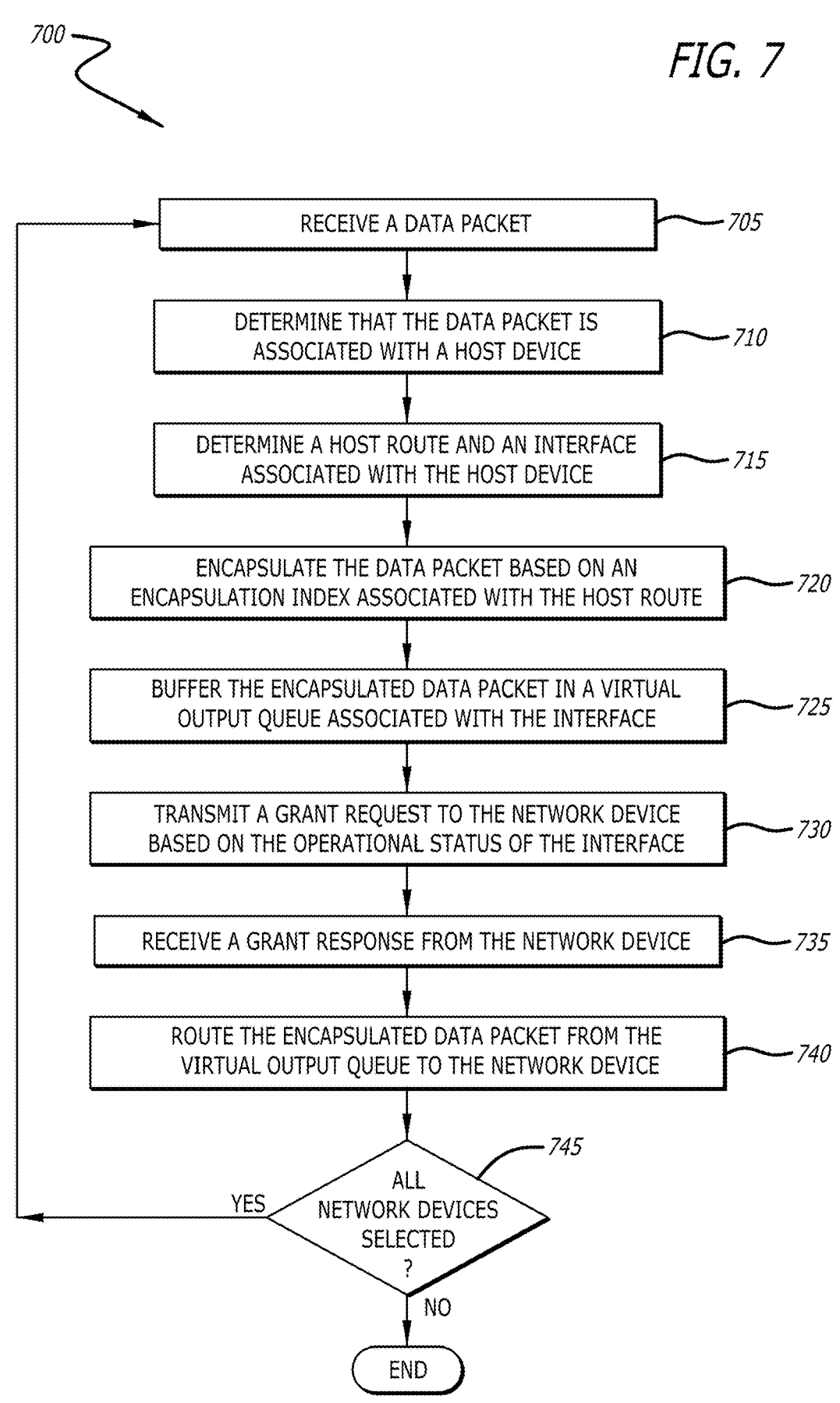

RECEIVE A DATA PACKET — 705

DETERMINE THAT THE DATA PACKET IS ASSOCIATED WITH A HOST DEVICE — 710

DETERMINE A HOST ROUTE AND AN INTERFACE ASSOCIATED WITH THE HOST DEVICE — 715

ENCAPSULATE THE DATA PACKET BASED ON AN ENCAPSULATION INDEX ASSOCIATED WITH THE HOST ROUTE — 720

BUFFER THE ENCAPSULATED DATA PACKET IN A VIRTUAL OUTPUT QUEUE ASSOCIATED WITH THE INTERFACE — 725

TRANSMIT A GRANT REQUEST TO THE NETWORK DEVICE BASED ON THE OPERATIONAL STATUS OF THE INTERFACE — 730

RECEIVE A GRANT RESPONSE FROM THE NETWORK DEVICE — 735

ROUTE THE ENCAPSULATED DATA PACKET FROM THE VIRTUAL OUTPUT QUEUE TO THE NETWORK DEVICE — 740

ALL NETWORK DEVICES SELECTED ? — 745

YES

NO

END

PACKET ROUTING IN DISAGGREGATED SCHEDULED FABRICS

This application claims the benefit of U.S. Provisional Patent Application No. 63/558,561, filed Feb. 27, 2024, which is incorporated by reference herein in its entirety.

The present disclosure relates to communication networks. More particularly, the present disclosure relates to packet routing and switching among multiple network devices.

BACKGROUND

Networks include a large number of network devices such as spine switches, leaf switches, routers, gateways etc. The spine and leaf switches may be interconnected in a leaf-spine topology to provide multiple roues for forwarding or routing data traffic in the network between endpoints. The spine switches may interconnect the leaf switches to form a backbone of the network. The leaf switches can function as an access layer that connects to host devices. The leaf switches may serve as entry and exit points for traffic originating from or destined to the host devices. When the host devices are connected to different leaf switches, a path between the host devices may include multiple hops. The leaf-spine fabric can provide a scalable and efficient architecture for routing large data flows and traffic within a data center network.

In some networks, packet forwarding decisions may be made at ingress of a leaf switch such as a Top of Rack (TOR) switch. When a data packet arrives at an ingress port of the leaf switch, the leaf switch can determine a header of the data packet and may perform the packet forwarding decisions locally. The leaf switch can forward the data packet in the leaf-spine fabric among multiple spine switches. The spine switches may perform one or more access control functions. The spine switches can route the data packet to an egress port of another leaf switch. The other leaf switch may transmit the data packet to the host device. Hence, the network may function as a unified system and manage resources across the spine and leaf switches. However, conventional leaf-spine fabrics lack a mechanism to share route information that is spread across multiple network devices.

SUMMARY OF THE DISCLOSURE

Systems and methods for providing routing of one or more data packets in a leaf-spine fabric in accordance with embodiments of the disclosure are described herein. In some embodiments, a device includes a processor, a memory communicatively coupled to the processor, and a packet routing logic, configured to identify an interface associated with a host device, determine a host route based on the interface, assign an encapsulation index based on the host route, and generate reachability data based on the encapsulation index.

In some embodiments, the interface includes one or more of a Media Access Control (MAC) address associated with the host device, an Internet Protocol (IP) address associated with the host device, a system port connected to the host device, or an attachment circuit associated with the host device.

In some embodiments, the packet routing logic is further configured to determine an operational status of the interface, and generate dynamic status data indicative of the operational status of the interface.

In some embodiments, the packet routing logic is further configured to establish one or more internal Border Gateway Protocol (iBGP) sessions with one or more network devices, generate an iBGP message based on at least one of the reachability data or the dynamic status data, and transmit the iBGP message to the one or more network devices.

In some embodiments, the packet routing logic is further configured to generate one or more extended community attributes indicative of at least one of the reachability data or the dynamic status data, and wherein the iBGP message includes the one or more extended community attributes.

In some embodiments, the iBGP message includes a Network Layer Reachability Information (NLRI) field indicative of at least one of the reachability data or the dynamic status data.

In some embodiments, the iBGP message is an Ethernet Virtual Private Network (EVPN) Route Type 2 message indicative of the MAC and IP addresses associated with the host device.

In some embodiments, the packet routing logic is further configured to assign an address family indicative of one or more of an IP version 4 (IPv4) address family, an IP version 6 (IPv6) address family, or an EVPN address family, and wherein the iBGP message is transmitted based on the assigned address family.

In some embodiments, the host route is one or more of a directly connected route, a static route, or an iBGP route.

In some embodiments, the packet routing logic is further configured to store at least one routing or forwarding table in the memory, and update the at least one routing or forwarding table based on the host route.

In some embodiments, a packet routing logic is configured to establish a communication session with a network device, receive, from the network device, an update message associated with a host device, extract reachability data from the update message, and determine, based on the reachability data, an encapsulation index indicative of a host route associated with the host device.

In some embodiments, the packet routing logic is further configured to determine, based on the reachability data, an interface including one or more of a Media Access Control address associated with the host device, an Internet Protocol address associated with the host device, a system port connected to the host device, or an attachment circuit associated with the host device.

In some embodiments, the packet routing logic is further configured to store at least one routing or forwarding table in the memory, and update the at least one routing or forwarding table based on the host route.

In some embodiments, the packet routing logic is further configured to extract, from the update message, dynamic status data indicative of an operational status of the interface.

In some embodiments, the packet routing logic is further configured to receive a data packet, determine that the data packet is associated with the host device, determine, based on the at least one routing or forwarding table, the host route and the interface associated with the host device, and encapsulate the data packet based on the encapsulation index associated with the host route to generate an encapsulated data packet.

In some embodiments, the packet routing logic is further configured to buffer the encapsulated data packet in a virtual output queue associated with the interface, transmit a grant request to the network device based on the operational status of the interface, receive a grant response from the network device, and route the encapsulated data packet from the virtual output queue to the network device based on the grant response.

In some embodiments, the communication session is an internal Border Gateway Protocol (iBGP) session and the update message is an iBGP update message.

In some embodiments, a method includes identifying an interface associated with a host device, determining a host route based on the interface, assigning an encapsulation index based on the host route, determining an operational status of the interface, and generating an update message indicative of the encapsulation index and the operational status.

In some embodiments, the interface includes one or more of a Media Access Control address associated with the host device, an Internet Protocol (IP) address associated with the host device, a system port connected to the host device, or an attachment circuit associated with the host device.

In some embodiments, a method includes establishing one or more internal Border Gateway Protocol sessions with one or more network devices, assigning an address family indicative of one or more of an IP version 4 address family, an IP version 6 address family, or an Ethernet Virtual Private Network address family, and transmitting the update message to the one or more network devices based on the assigned address family.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart depicting a process for generating and transmitting an update message, in accordance with various embodiments of the disclosure;

FIG. 6 is a flowchart depicting a process for updating a routing and/or forwarding table, in accordance with various embodiments of the disclosure;

FIG. 7 is a flowchart depicting a process for routing one or more data packets, in accordance with various embodiments of the disclosure.

Figure 1:
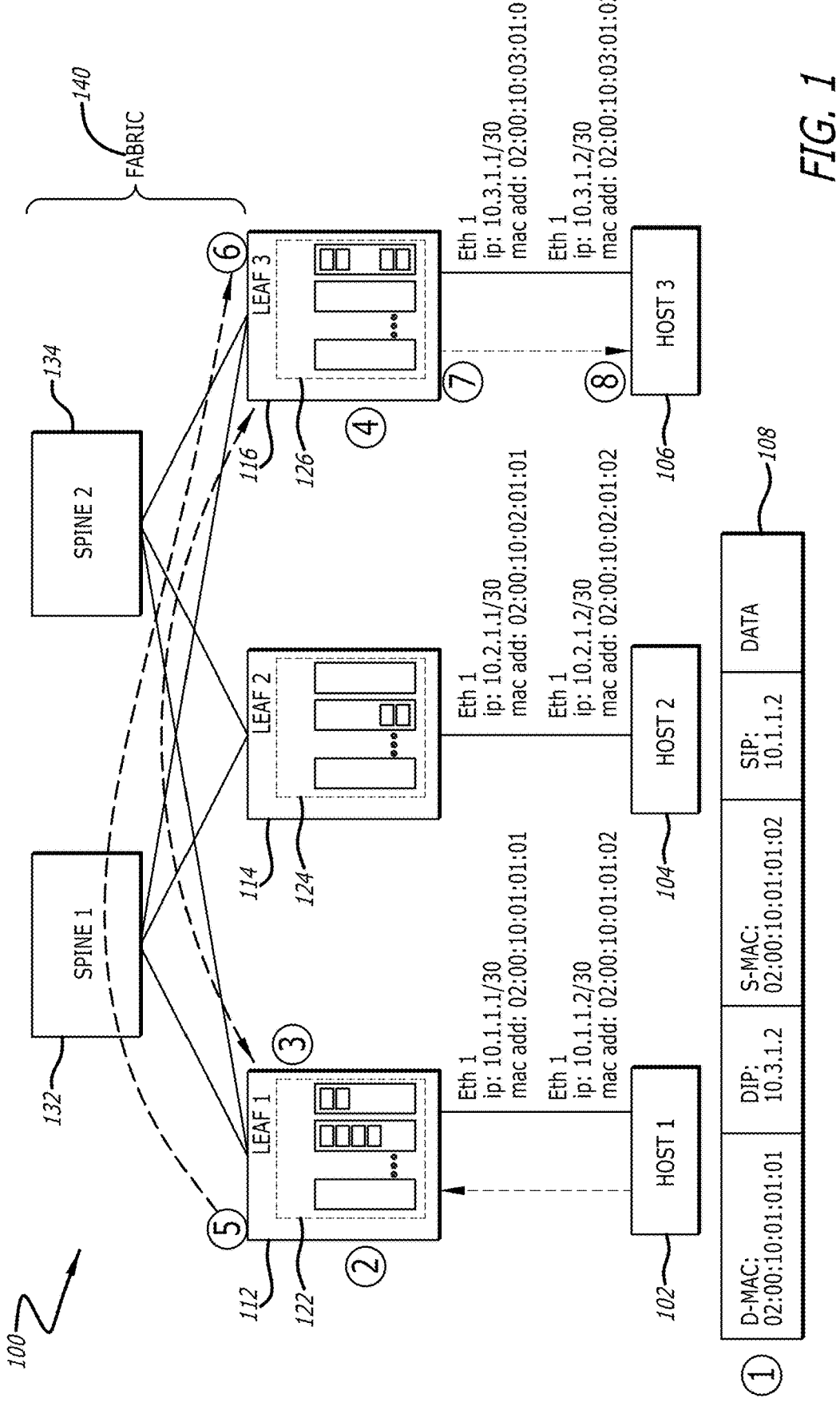
FIG. 1 is a conceptual illustration of a network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide packet routing and switching among multiple network devices in a Disaggregated Scheduled Fabric (DSF). In many embodiments, the DSF may include numerous network devices such as but not limited to spine switches or leaf switches, for example. A plurality of spine and leaf switches can be connected in a leaf-spine topology, i.e., leaf-spine fabric. The leaf switches may include Top-Of-Rack (TOR) switches or End of Row (EOR) switches etc., for example. Multiple TOR switches and one or more spine switches can be connected in a mesh topology. The TOR switches may be deployed at an edge of a network, near servers, storage arrays, and other network devices such as but not limited to application servers or virtual machines etc. for example. The TOR switches can be connected one or more host devices directly or indirectly. The TOR switches may also facilitate Virtual Local Area Network (VLAN) tagging, routing protocols, access control lists, or Quality of Service (QOS) etc., for example.

In a number of embodiments, a first leaf switch may be in communication with a host device. The first leaf switch can be directly or indirectly connected to the host device by way of one or more types of routes, such as but not limited to static routes, dynamic routes, or directly connected routes, etc. for example. In the directly connected routes, the host device can be in a subnet directly connected to an active interface of the first leaf switch. The directly connected routes may be automatically detected and recorded by the first leaf switch when the first leaf switch is configured and/or is operational. In static routes, a route for the host device may be configured in the first leaf switch by an operator. In numerous embodiments, for example, the operator may configure, on the first leaf switch, a static route for the host device such that data traffic destined for the host device may be forwarded through a specific next-hop network device, such as but not limited to a router, for example. In dynamic routes, the first leaf switch can utilize one or more routing protocols to determine the route for the host device. Examples of the routing protocols may include, but are not limited to, Open Shortest Path First (OSPF), Border Gateway Protocol (BGP), or Routing Information Protocol (RIP) etc.

In various embodiments, the first leaf switch may store at least one routing or forwarding table in a memory. In some embodiments, for example, the first leaf switch can store a routing table that may store route information for the network devices and the host devices. In certain embodiments, for example, the first leaf switch can store a forwarding table that can store port information of connected network devices and host devices. In some more embodiments, for example, the first leaf switch can facilitate multiple routing or forwarding tables by way of Virtual routing and forwarding (VRF). In more embodiments, for example, the first leaf switch may store a route database in the memory. The route database can store the routes, the ports, or other routing and/or forwarding information associated with the network devices and host devices. The first leaf switch can determine the route for the host device and update the routing or forwarding table to store the route information.

In additional embodiments, the first leaf switch can determine an interface associated with the host device. In some embodiments, the first leaf switch may determine a Media Access Control (MAC) address associated with the host device. The host device can be associated with an Internet Protocol (IP) address. In some embodiments, the first leaf switch may utilize Address Resolution Protocol (ARP) to determine one or more addresses, including the MAC and IP addresses, associated with the host device. The first leaf switch can store an ARP table to record the MAC and IP addresses associated with multiple host devices. In more embodiments, the first leaf switch can determine a system port associated with the host device. The first leaf switch may determine the system port based on the protocol. In some more embodiments, for example, the first leaf switch can determine an attachment circuit associated with the host route. The attachment circuit may indicate a physical connection or a logical connection between the first leaf switch and the host device or another network device. In numerous embodiments, examples of the attachment circuits can include but are not limited to Ethernet interfaces or VLAN etc. associated with the host device.

In further embodiments, the first leaf switch can assign an encapsulation index associated with the host device based on the host route. In some embodiments, the encapsulation index may include one or more attributes such as but not limited to one or more extended community attributes or tunnel encapsulation attributes, etc. for example. In certain embodiments, for example, the tunnel encapsulation attributes can be indicative of one or more of: an egress point, Virtual Network Identifier (VNI), an address family, or one or more Type/Length/Value tuples (TLVs) etc. The encapsulation index can be utilized by the network devices for routing one or more data packets associated with the host device through the leaf-spine fabric. The first leaf switch may generate reachability data based on the encapsulation index. The first leaf switch can also determine an operational status of the interface. In more embodiments, for example, the operational status may indicate whether the interface and/or the host device are active, or whether the interface and/or the host device can transmit and/or receive the data packets associated with the host device. The first leaf switch may generate dynamic status data indicative of the operational status. Thereafter, the first leaf switch may generate a first extended community attribute indicative of the reachability data and a second extended community attribute indicative of the dynamic status data. The first leaf switch may generate an update message based on at least one of: the reachability data or the dynamic status data. In some more embodiments, for example, the update message may include the first and second extended community attributes. In numerous embodiments, for example, the update message can include a Network Layer Reachability Information (NLRI) field indicative of at least one of: the reachability data or the dynamic status data. In many more embodiments, for example, the update message can be Ethernet Virtual Private Network (EVPN) Route Type 2 message indicative of the MAC and IP addresses associated with the host device.

In many more embodiments, the first leaf switch may establish one or more internal BGP (iBGP) sessions with one or more network devices in the leaf-spine fabric, including a second leaf switch. The first leaf switch can assign an address family indicative of one or more of: an IP version 4 (IPv4) address family, an IP version 6 (IPv6) address family, or an EVPN address family. In some embodiments, for example, the update message may include a BGP message or an iBGP message. In certain embodiments, for example, the BGP message or the iBGP message can include a BGP update message or an iBGP update message. The first leaf switch may transmit the iBGP update message to the one or more network devices, including the second leaf switch. In some embodiments, for example, the first leaf switch may transmit the iBGP update message upon detecting a change in the operational status of the interface and/or the host device. In certain embodiments, for example, the first leaf switch can periodically transmit the iBGP update message at predetermined intervals. In more embodiments, the predetermined intervals may be configurable or may vary for different network devices in the leaf-spine fabric. The second leaf switch can receive the iBGP update message and extract the reachability data and dynamic status data from the iBGP update message. Thereafter, the second leaf switch may update the routing or forwarding table stored in the memory of the second leaf switch based on the iBGP update message.

In many additional embodiments, the second leaf switch can receive a data packet associated with the host device. The second leaf switch may determine the host route and corresponding interface from the updated routing or forwarding table. The second leaf switch may determine whether the dynamic status associated with the interface and/or the host device indicates that the interface and/or the host device is in the operational state. The second leaf switch may encapsulate the data packet based on the encapsulation index identified in the updated routing or forwarding table. Thus, the second leaf switch can generate an encapsulated data packet and buffer the encapsulated data packet in a Virtual Output Queue (VOQ) associated with the interface. In some embodiments, for example, the second leaf switch may include a plurality of VOQs associated with a plurality of routes in the routing or forwarding table. The second leaf switch can send a grant request to the first leaf switch. Upon receiving a grant response, the second leaf switch can route the data packet to the first leaf switch through the leaf-spine fabric.

Advantageously, the leaf switches in the leaf-spine fabric may dynamically detect the host routes associated with the host devices, generate the encapsulation indexes based on the host routes, and share the encapsulation indexes by establishing iBGP sessions. The leaf switches can also dynamically detect and share the operational statuses of the interfaces or the host devices, to indicate when the interface or the host device shuts down. The network devices may dynamically update the routing or forwarding tables. Therefore, the leaf-spine fabric of the present disclosure can facilitate efficient utilization of network resources, reduced data loss, reduced latency, and efficient communication.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network 100, in accordance with various embodiments of the disclosure is shown. In many embodiments, the network 100 may comprise first through third host devices 102-106, and a plurality of network devices including first through third leaf switches 112-116 and first and second spine switches 132-134. In some embodiments, the first through third leaf switches 112-116 and the first and second spine switches 132-134 may be interconnected in a mesh topology to form a leaf-spine fabric 140. In certain embodiments, for example, the leaf-spine fabric 140 may be a Disaggregated Scheduled Fabric (DSF). In more embodiments, for example, the first through third leaf switches 112-116 and the first and second spine switches 132-134 may implement one or more open-source operating systems such as but not limited to Software for Open Networking in the Cloud (SONIC), for example. In more embodiments, the leaf-spine fabric 140 can implement a control plane in conjunction with a scheduled fabric data plane. In that, the leaf-spine fabric 140 may be deployed for multiple applications, such as but not limited to Equal Cost Multi-Path (ECMP) routing, enhanced Ethernet with in-band telemetry, or scheduled fabric data planes etc. In some more embodiments, the leaf-spine fabric 140 can utilize internal Border Gateway Protocol (BGP) such as an internal BGP (iBGP) in a full mesh topology among a plurality of leaf switches including the first through third leaf switches 112-116 to re-distribute externally learnt prefixes for routing. The leaf-spine fabric 140 may facilitate system port representation for network-facing ports of the first through third leaf switches 112-116. The leaf-spine fabric 140 can also implement Virtual Output Queues (VOQs) associated with one or more system ports of the plurality of network devices. The first leaf switch 112 may include a first set of VOQs 122, the second leaf switch 114 can include a second set of VOQs 124, and the third leaf switch 116 may include a third set of VOQs 126.

In a number of embodiments, at Step 1, the first leaf switch 112 can receive a data packet 108 from a first host device 102. The data packet 108 may include a destination Media Access Control (MAC) address, a destination Internet Protocol (IP) address, a source MAC address, a source IP address, and data etc., for example. In some embodiments, for example, the first leaf switch 112 may be a default gateway for the first host device 102. In numerous embodiments, at Step 2, the first leaf switch 112 may determine a MAC address associated with the first host device 102. The first leaf switch 112 can also determine the destination IP address or MAC address associated with the data packet 108. In certain embodiments, for example, the first leaf switch may perform a lookup in a MAC address table, such as but not limited to an Ethernet MAC table or a Content Addressable Memory (CAM) table. The MAC address table can store information about multiple ports of the plurality of network devices to which the first leaf switch 112 may be connected. The MAC address table may include one or more static entries and/or one or more dynamic entries indicative of the ports of the plurality of network devices. The first leaf switch 112 can determine a destination port where the data packet 108 is to be routed.

In various embodiments, the data packet 108 can be addressed to the third host device 106. The third host device 103 may be connected to the third leaf switch 116. The third leaf switch 116 can determine an interface associated with the third host device 106. The interface may include the MAC or IP addresses of the third host device 106, a system port connected to the third host device 106, or an attachment circuit associated with the third host device 106. The third leaf switch 116 may utilize Address Resolution Protocol (ARP) to determine one or more addresses, including the MAC and IP addresses, associated with the third host device 106. The attachment circuit may indicate a physical connection or a logical connection between the third leaf switch 116 and the third host device 106 or another network device. In numerous embodiments, examples of the attachment circuits can include but are not limited to Ethernet interfaces or Virtual Local Area Network (VLAN) etc. associated with the third host device 106.

In additional embodiments, the third leaf switch 116 can determine a host route associated with the third host device 106. The host route may be indicative one or more types of routes, such as but not limited to static routes, dynamic routes, or connected routes, etc. for example. In the connected routes, the third host device 106 can be in a subnet directly connected to an active interface of the third leaf switch 116. The connected routes may be automatically detected and recorded by the third leaf switch 116 when the third leaf switch 116 is configured and/or is operational. In static routes, a route for the third host device 106 may be configured in the third leaf switch 116 by an operator. In numerous embodiments, for example, the operator may configure, on the third leaf switch 116, a static route for the third host device 106 such that data traffic destined for the third host device 106 may be forwarded through a specific next-hop network device, such as but not limited to a router, for example. In dynamic routes, the third leaf switch 116 can utilize one or more routing protocols to determine the route for the host device. Examples of the routing protocols may include, but are not limited to, Open Shortest Path First (OSPF), BGP, or Routing Information Protocol (RIP) etc.

In further embodiments, the third leaf switch 116 can assign an encapsulation index associated with the third host device 106 based on the host route. In some embodiments, the encapsulation index may include one or more attributes such as but not limited to one or more extended community attributes or tunnel encapsulation attributes, etc. for example. In certain embodiments, for example, the tunnel encapsulation attributes can be indicative of one or more of: an egress point, Virtual Network Identifier (VNI), an address family, or one or more Type/Length/Value tuples (TLVs) etc. The encapsulation index can be utilized by the plurality of network devices for routing one or more data packets associated with the host device through the leaf-spine fabric 140. The third leaf switch 116 may generate reachability data based on the encapsulation index. The third leaf switch 116 can determine an operational status of the interface. In more embodiments, for example, the operational status may indicate whether the interface and/or the third host device 106 are active, or whether the interface and/or the host device can transmit and/or receive the data packets associated with the third host device 106. The third leaf switch 116 may generate dynamic status data indicative of the operational status. Thereafter, the third leaf switch 116 may generate a first extended community attribute indicative of the reachability data and a second extended community attribute indicative of the dynamic status data. The third leaf switch 116 may generate an iBGP update message based on at least one of: the reachability data or the dynamic status data. In some more embodiments, for example, the iBGP update message may include the first and second extended community attributes. In numerous embodiments, for example, the iBGP update message can include a Network Layer Reachability Information (NLRI) field indicative of at least one of: the reachability data or the dynamic status data. In many more embodiments, for example, the iBGP update message can be an Ethernet Virtual Private Network (EVPN) Route Type 2 message indicative of the MAC and IP addresses associated with the third host device 106.

In many more embodiments, the third leaf switch 116 may establish one or more iBGP sessions with the plurality of network devices in the leaf-spine fabric 140, including the first leaf switch 112. The third leaf switch 116 can assign an address family indicative of one or more of: an IP version 4 (IPv4) address family, an IP version 6 (IPv6) address family, or an EVPN address family. The third leaf switch 116 may transmit the iBGP update message to the plurality of network devices, including the first leaf switch 112. In some embodiments, for example, the third leaf switch 116 may transmit the iBGP update message upon detecting a change in the operational status of the interface and/or the third host device 106. In certain embodiments, for example, the third leaf switch 116 can periodically transmit the iBGP update message at predetermined intervals. In more embodiments, the predetermined intervals may be configurable or may vary for different network devices in the leaf-spine fabric 140. The first leaf switch 112 can receive the iBGP update message and extract the reachability data and dynamic status data from the iBGP update message. Thereafter, the first leaf switch 112 may update the routing or forwarding table stored in the memory of the first leaf switch 112 based on the iBGP update message.

In many additional embodiments, the first leaf switch 112 may determine whether the dynamic status associated with the interface and/or the third host device 106 indicates that the interface and/or the third host device 106 is in the operational state. The first leaf switch 112 may encapsulate the data packet 108 based on the encapsulation index identified in the updated routing or forwarding table. Thus, the first leaf switch 112 can generate an encapsulated data packet. In more embodiments, at Step 3, the first leaf switch 112 may buffer the encapsulated data packet in the first set of VOQs 122 associated with the interface. In more embodiments, for example, the first leaf switch 112 can map the data packet 108 or the encapsulated data packet to one VOQ of the first set of VOQs 122 based on a type of the data packet 108 or one or more classifiers associated with the data packet 108. The first leaf switch 112 may classify the data packet 108 based on a protocol type, source and/or destination IP addresses, source and/or destination port numbers, or any other attributes defined by network policies etc. for example. In some embodiments, each VOQ of the first set of VOQs 122 may be associated with a specific system port or interface on the first leaf switch 112. The mapping of the data packet 108 to the one or more VOQs of the first set of VOQs 122 can be based on one or more classification rules configured in a forwarding logic of the first leaf switch 112. The first leaf switch 112 can send a grant request to the third leaf switch 116. The grant request may be indicative of requesting the third leaf switch 116 to provide credit to ensure that the OQs have sufficient buffer space to store the data packet 108. The credit mechanism can help in preventing congestion and ensuring that the third leaf switch 116 can handle traffic bursts without dropping packets. In more embodiments, at Step 4, if sufficient credit is granted by the third leaf switch 116, the traffic from the first set of VOQs 122 can be forwarded over the leaf-spine fabric 140 to the corresponding OQs of the third leaf switch 116 for transmission. In that, upon receiving a grant response from the third leaf switch 116, the first leaf switch 112 can route the data packet 108 to the third leaf switch 116 through the leaf-spine fabric 140.

In many further embodiments, at Steps 5 and 6, the encapsulated data packet may be transmitted over the leaf-spine fabric 140. The encapsulated data packet can be transmitted with a packet context data. In some embodiments, for example, the packet context data may include metadata about the data packet 108, such as but no limited to information about an ingress port, an egress port, a VLAN tag, Quality of service (QOS) parameters, and any other relevant information for routing or processing the data packet 108. The first leaf switch 112 can be connected to the one or more network devices through one or more fabric links. The first leaf switch 112 may implement one or more load balancing mechanisms such as but not limited to a weighted round-robin load balancing technique, for example. The first leaf switch 112 can distribute the encapsulated data packets and the corresponding packet context data across multiple fabric links. Each fabric link may be assigned a weight, which can determine a share of the traffic. Higher-weighted fabric links can receive more share of the traffic compared to lower-weighted fabric links. The round-robin technique may ensure that the traffic is evenly distributed among the fabric links. The first leaf switch 112 may maintain a table or a data structure to store the weights assigned to each fabric link, along with information about a current load on each fabric link.

In still many embodiments, at Steps 7 and 8, at the third leaf switch 116 can decapsulate the encapsulated data packet and transmit the data packet 108 to the third host device 106. The third leaf switch 116 may remove the packet context data from the encapsulated data packet. The third leaf switch 116 may further encapsulate the data packet with the destination address of the third host device 106. In some embodiments, the destination address can be the MAC address associated with the third host device 106. In that, the third leaf switch 116 may add an Ethernet packet header indicative of the MAC address of the third host device 106. The third host device 106 may receive the data packet 108 from the third leaf switch 116.

Although a specific embodiment for the network 100 for carrying out the various steps, processes, methods, and operations described herein is discussed with respect to FIG. 1, any of a variety of systems and/or processes may be utilized in accordance with embodiments of the disclosure. For example, the leaf-spine fabric 140 can dynamically advertise the encapsulation index and/or the operational statuses among the plurality of network devices. The elements depicted in FIG. 1 may also be interchangeable with other elements of FIGS. 2-8 as required to realize a particularly desired embodiment.

Figure 2:
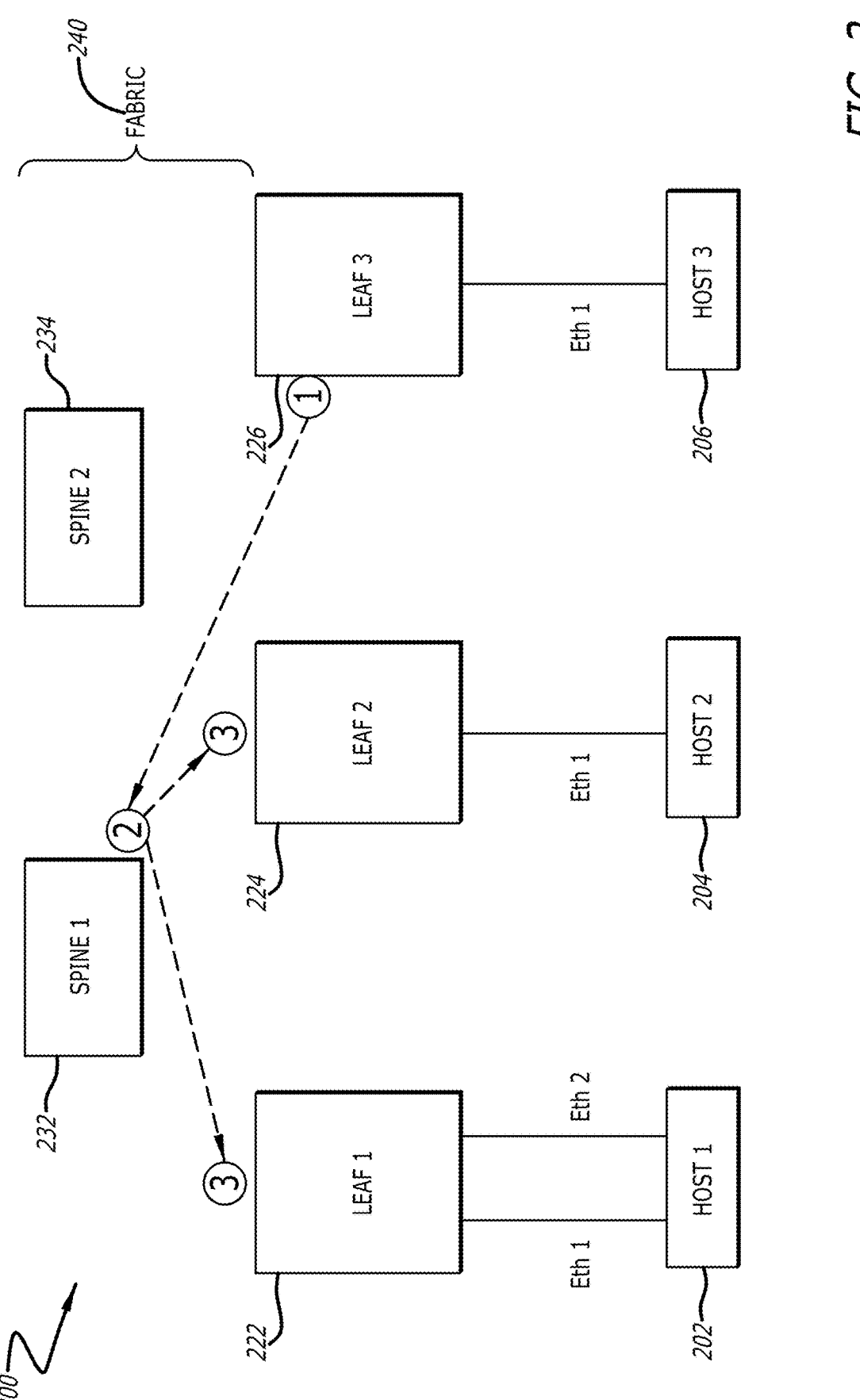
FIG. 2 is a conceptual illustration of a network, in accordance with various embodiments of the disclosure.

Referring to FIG. 2, a conceptual illustration of a network 200, in accordance with various embodiments of the disclosure is shown. In many embodiments, the network 200 may comprise first through third host devices 202-206, and a plurality of network devices including first through third leaf switches 222-226 and first and second spine switches 232-234. In some embodiments, the first through third leaf switches 222-226 and the first and second spine switches 232-234 may be interconnected in the mesh topology to form a leaf-spine fabric 240. In certain embodiments, for example, the leaf-spine fabric 240 may be the DSF.

In a number of embodiments, at Step 1, the third leaf switch 226 may be powered on. Upon powering on, the third leaf switch 226 can initialize the system ports, processor, memory, interfaces, and any installed modules. The third leaf switch 226 can load the OS and configuration settings from a non-volatile memory, such as a flash memory or a boot image. The third leaf switch 226 can discover neighboring devices and establish network connections with the neighboring devices. The third leaf switch 226 may negotiate one or more link parameters with directly connected neighboring devices to establish communication over the network connections.

In various embodiments, at Steps 2 and 3, the third leaf switch 226 can establish iBGP sessions with the first leaf switch 222 and the second leaf switch 224. The third leaf switch 226 may generate and transmit the iBGP update message or a BGP advertisement indicative of the directly connected routes of the third leaf switch 226. In some embodiments, for example, the iBGP update message or the BGP advertisement may include information about the routes, such as but not limited to a destination network and/or subnet, next-hop IP address, and any associated attributes such as but not limited to route origin, Autonomous System (AS) path, route type etc., for example. The first leaf switch 222 and the second leaf switch 224 can process the routes and determine whether to install the routes in corresponding routing or forwarding tables in the first leaf switch 222 and the second leaf switch 224. The first leaf switch 222 and the second leaf switch 224 may utilize the installed routes to forward the traffic to the third leaf switch 226 or the devices connected to the third leaf switch 226. If the route is best match for the destination, the first leaf switch 222 and the second leaf switch 224 may forward the data packet towards the next-hop IP address specified in the BGP advertisement. In some embodiments, for example, the first leaf switch 222 may forward the traffic to the first spine switch 232 to transmit the traffic to the third leaf switch 226.

Although a specific embodiment for the network 200 for carrying out the various steps, processes, methods, and operations described herein is discussed with respect to FIG. 2, any of a variety of systems and/or processes may be utilized in accordance with embodiments of the disclosure. For example, the network 200 can utilize the leaf-spine fabric 240 to dynamically establish iBGP sessions in the full mesh topology. The elements depicted in FIG. 2 may also be interchangeable with other elements of FIG. 1 and FIGS. 3-8 as required to realize a particularly desired embodiment.

Figure 3:
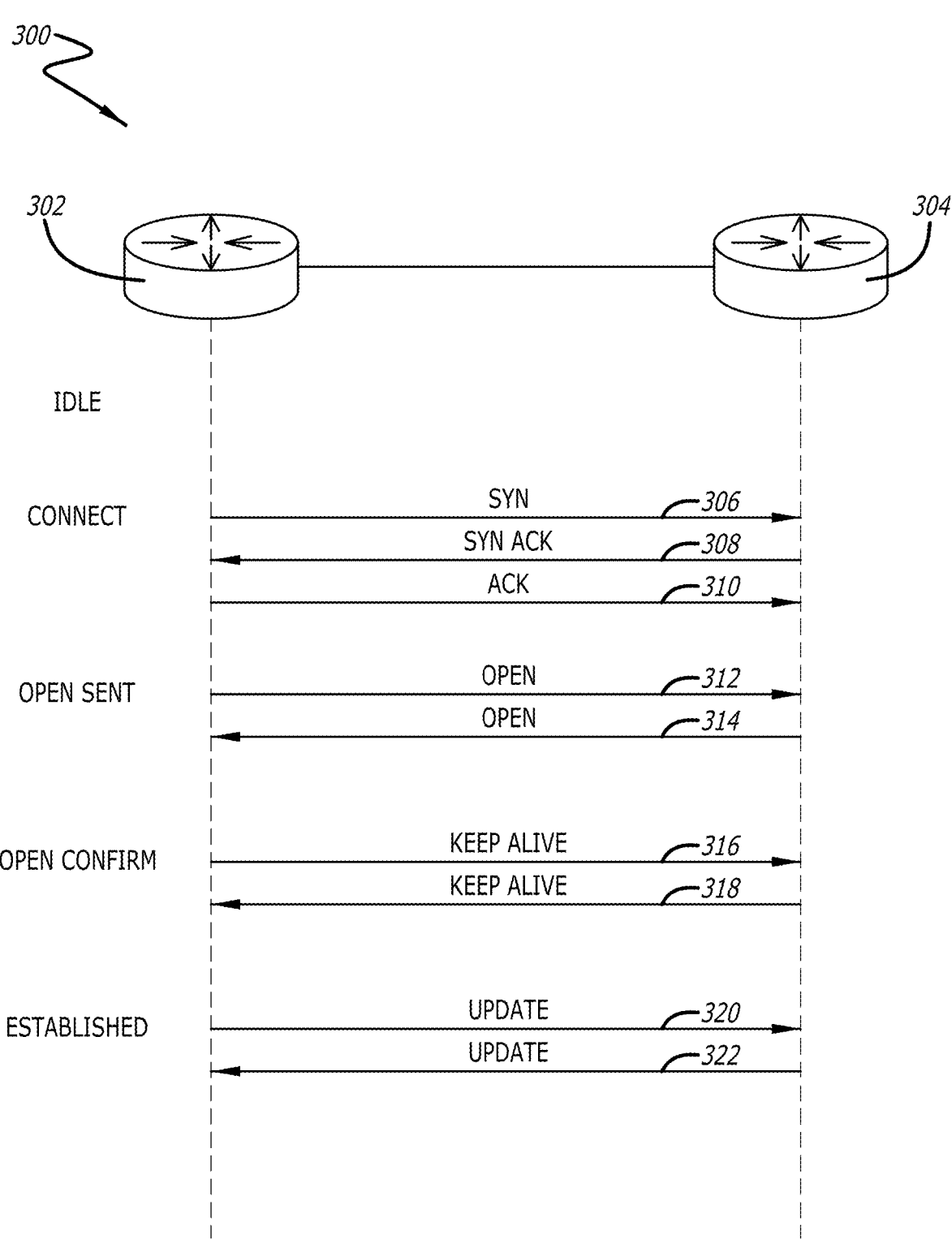
FIG. 3 is a conceptual illustration of a network for establishing a Border Gateway Protocol (BGP) session, in accordance with various embodiments of the disclosure.

Referring to FIG. 3, a conceptual illustration of a network 300 for establishing the BGP session, in accordance with various embodiments of the disclosure is shown. In many embodiments, the network 300 may comprise a first network device 302 and a second network device 304. Examples of the first network device 302 and the second network device 304 include but are not limited to spine switches and leaf switches in a leaf-spine fabric. Initially, the first network device 302 and the second network device 304 may be in an idle state. At Step 306, the first network device 302 can send a synchronization request to the second network device 304. In the synchronization request, the first network device 302 may select a sequence number. The synchronization request can be indicative of the sequence number. At Step 308, the second network device 304 may send a synchronization acknowledgment to the first network device 302. The second network device 304 may select another sequence number. The synchronization acknowledgement can be indicative of the other sequence number. At Step 310, the first network device 302 can send an acknowledgement to the second network device 304. The acknowledgement may be indicative of incrementing the other sequence number. The Steps 306-308 may indicate establishment of a three-way Transmission Control Protocol (TCP) handshake between the first network device 302 and the second network device 304.

In a number of embodiments, at Step 312, the first network device 302 may send an open message. The open message can be indicative of a BGP version number, an Autonomous System Number (ASN) of the originating router, a hold time, BGP identifier, or other BGP parameters indicative of BGP session capabilities. In response, at Step 314, the second network device 304 can send another open message. At Steps 312-314, the first network device 302 and the second network device 304 may negotiate one or more capabilities of the BGP session and establish a BGP adjacency.

In various embodiments, at Steps 316 and 318, the first network device 302 and the second network device 304 may exchange keepalive messages. In some embodiments, for example, the keepalive messages may be exchanged every one-third of the hold timer agreed upon between the first network device 302 and the second network device 304. At Steps 320 and 322, the first network device 302 and the second network device 304 may exchange update messages. The update messages can function as the keepalive messages to reduce traffic overhead. Upon receipt of the update messages and/or the keepalive, the first network device 302 and the second network device 304 may reset the hold timer to an initial value of the hold timer.

In additional embodiments, the update messages can advertise routing information such as but not limited to path attributes and prefixes and/or can withdraw previously advertised routing information. The update messages may include NLRI fields. The NLRI fields can include one or more prefixes corresponding to one or more BGP peers, i.e., other network devices. In some embodiments, the update messages may include the reachability data and the dynamic status data associated with the one or more host devices. The reachability data can be indicative of the host routes, MAC and/or IP addresses of the host devices, next-hop addresses associated with the host devices, neighbor relationships, or encapsulation indexes associated with the host devices etc. The dynamic status data may be indicative of operational statuses of the network devices, the host devices, or the interfaces connected to the host devices etc. for example. The update messages may also be indicative of the system ports associated with the host routes.

Although a specific embodiment for the network 300 for establishing the BGP session, processes, methods, and operations described herein is discussed with respect to FIG. 3, any of a variety of systems and/or processes may be utilized in accordance with embodiments of the disclosure. For example, the network 300 can dynamically share the update messages among the network devices. The elements depicted in FIG. 3 may also be interchangeable with other elements of FIGS. 1-2 and FIGS. 4-8 as required to realize a particularly desired embodiment.

Figure 4:
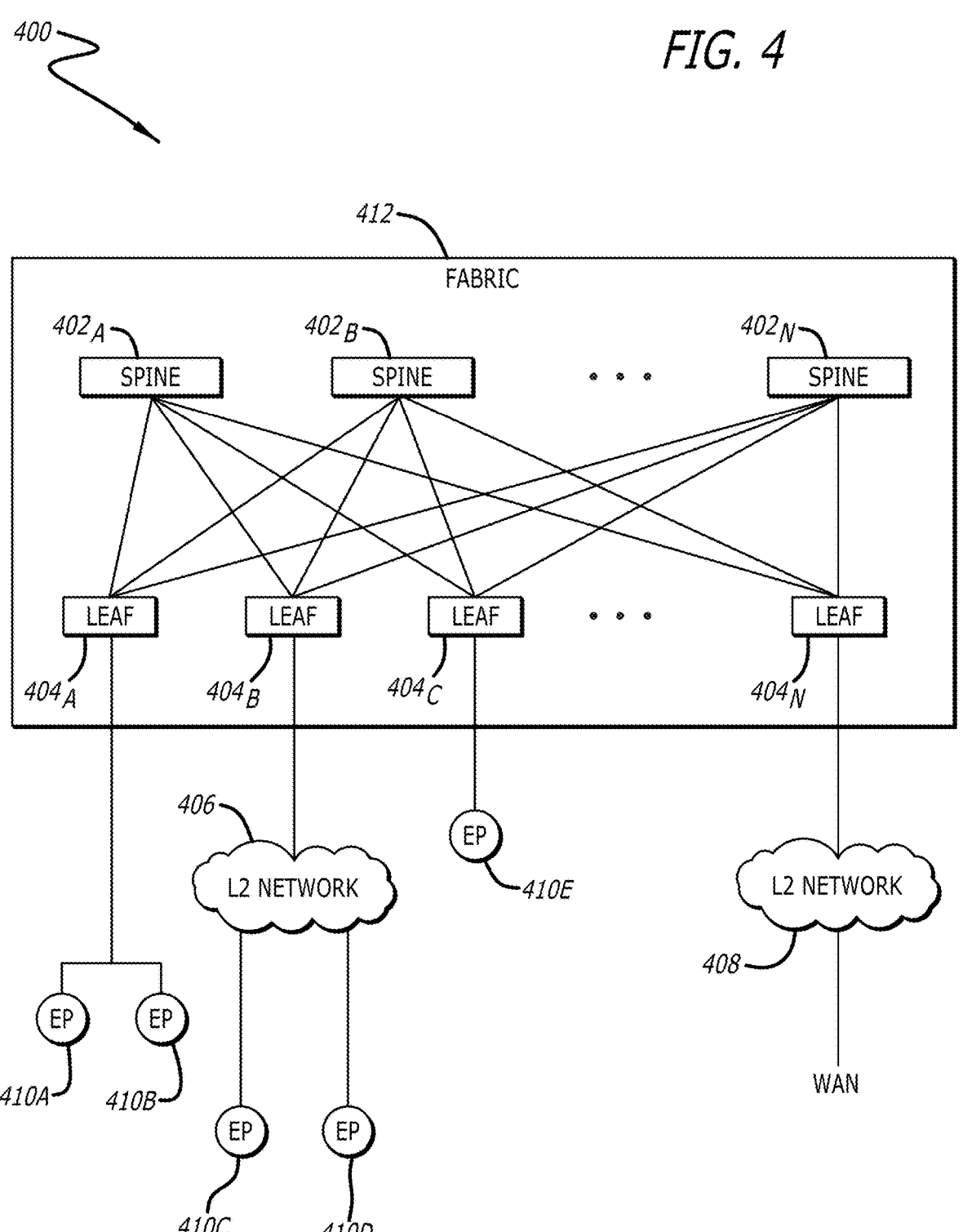
FIG. 4 is a schematic block diagram of an example architecture for a network fabric, in accordance with various embodiments of the disclosure.

Referring now to FIG. 4, a schematic block diagram of an example architecture 400 for a network fabric 412, in accordance with various embodiments of the disclosure is shown. The network fabric 412 can include spine switches $402_A$, $402_B$, . . . , $402_N$ (collectively "402") connected to leaf switches $404_A$, $404_B$, $404_C$ . . . $404_N$ (collectively "404") in the network fabric 412. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 402 can be L3 switches in the fabric 412. However, in some cases, the spine switches 402 can also, or otherwise, perform L2 functionalities. Further, the spine switches 402 can support various capabilities, such as, but not limited to, 40 or 10 Gbps Ethernet speeds. To this end, the spine switches 402 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 402 can be configured to host a proxy function that performs a lookup of the endpoint address identifier to locator mapping in a mapping database on behalf of leaf switches 404 that do not have such mapping. The proxy function can do this by parsing through the packet to the encapsulated tenant packet to get to the destination locator address of the tenant. The spine switches 402 can then perform a lookup of their local mapping database to determine the correct locator address of the packet and forward the packet to the locator address without changing certain fields in the header of the packet.

In various embodiments, when a packet is received at a spine switch $402_i$, wherein subscript "i" indicates that this operation may occur at any spine switch $402_A$ to $402_N$, the spine switch $402_i$ can first check if the destination locator address is a proxy address. If so, the spine switch $402_i$ can perform the proxy function as previously mentioned. If not, the spine switch $402_i$ can look up the locator in its forwarding table and forward the packet accordingly.

In a number of embodiments, one or more spine switches 402 can connect to one or more leaf switches 404 within the fabric 412. Leaf switches 404 can include access ports (or non-fabric ports) and fabric ports. Fabric ports can provide uplinks to the spine switches 402, while access ports can provide connectivity for devices, hosts, endpoints, VMs, or external networks to the fabric 412.

In more embodiments, leaf switches 404 can reside at the edge of the fabric 412, and can thus represent the physical network edge. In some cases, the leaf switches 404 can be top-of-rack ("ToR") switches configured according to a ToR architecture. In other cases, the leaf switches 404 can be aggregation switches in any particular topology, such as end-of-row (EoR) or middle-of-row (MoR) topologies. The leaf switches 404 can also represent aggregation switches, for example.

In additional embodiments, the leaf switches 404 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, the leaf switches 404 can contain virtual switching functionalities, such as a virtual tunnel endpoint (VTEP) function. To this end, leaf switches 404 can connect the fabric 412 to an overlay network.

In further embodiments, network connectivity in the fabric 412 can flow through the leaf switches 404. Here, the leaf switches 404 can provide servers, resources, endpoints, external networks, or VMs access to the fabric 412, and can connect the leaf switches 404 to each other. In some cases, the leaf switches 404 can connect endpoint groups to the fabric 412 and/or any external networks. Each endpoint group can connect to the fabric 412 via one of the leaf switches 404, for example.

Endpoints 410 A-E (collectively "410", shown as "EP") can connect to the fabric 412 via leaf switches 404. For example, endpoints 410A and 410B can connect directly to leaf switch 404A, which can connect endpoints 410A and 410B to the fabric 412 and/or any other one of the leaf switches 404. Similarly, endpoint 410E can connect directly to leaf switch 404C, which can connect endpoint 410E to the fabric 412 and/or any other of the leaf switches 404. On the other hand, endpoints 410C and 410D can connect to leaf switch 404B via L2 network 406. Similarly, the wide area network (WAN) can connect to the leaf switches 404C or 404D via L3 network 408.

In certain embodiments, endpoints 410 can include any communication device, such as a computer, a server, a switch, a router, etc. In some cases, the endpoints 410 can include a server, hypervisor, or switch configured with a VTEP functionality which connects an overlay network, with the fabric 412. The overlay network can host physical devices, such as servers, applications, endpoint groups, virtual segments, virtual workloads, etc. In addition, the endpoints 410 can host virtual workload(s), clusters, and applications or services, which can connect with the fabric 412 or any other device or network, including an external network. For example, one or more endpoints 410 can host, or connect to, a cluster of load balancers or an endpoint group of various applications.

Although a specific embodiment for an architecture 400 is described above with respect to FIG. 4, any of a variety of systems and/or processes may be utilized in accordance with embodiments of the disclosure. For example, the architecture 400 could comprise any variety of endpoints, spine switches, and/or leaf switches. The elements depicted in FIG. 4 may also be interchangeable with other elements of FIGS. 1-3 and 5-8 as required to realize a particularly desired embodiment. More details about an overlay network are described in more detail below.

Referring now to FIG. 5, a flowchart depicting a process 500 for generating and transmitting the update message, in accordance with various embodiments of the disclosure is shown. In many embodiments, the process 500 can identify the interface associated with the host device (block 505). In numerous embodiments, the process 500 may be implemented by the leaf switch such as but not limited to the TOR switch connected to multiple spine devices. In some embodiments, the process 500 may determine the MAC address associated with the host device. In certain embodiments, the process 500 may utilize the ARP to determine one or more addresses, including the MAC and IP addresses, associated with the host device. In more embodiments, the process 500 can store the ARP table to record the MAC and IP addresses associated with the host device. In some more embodiments, the process 500 can determine the system port associated with the host device. In many more embodiments, the process 500 may determine the system port based on the protocol. In many further embodiments, for example, the process 500 can determine the attachment circuit associated with the host route. In still many embodiments, the attachment circuit may indicate the physical connection or the logical connection between the leaf switch and the host device or another network device. In numerous embodiments, examples of the attachment circuits can include but are not limited to Ethernet interfaces or VLAN etc. associated with the host device.

In a number of embodiments, the process 500 may determine the host route based on the interface (block 510). In some embodiments, the host route can be indicative of one or more types of routes, such as but not limited to static routes, dynamic routes, or connected routes, etc. for example. In certain embodiments, in the connected routes, the host device can be in the subnet directly connected to the active interface of the leaf switch. In more embodiments, the connected routes may be automatically detected and recorded by the process 500 when the leaf switch is configured and/or is operational. In more embodiments, in static routes, the route for the host device may be configured in the leaf switch by an operator. In numerous embodiments, for example, the operator may configure, on the leaf switch, the static route for the host device such that data traffic destined for the host device may be forwarded through a specific next-hop network device, such as but not limited to the router, for example. In many more embodiments, in dynamic routes, the leaf switch can utilize one or more routing protocols to determine the route for the host device. In still many embodiments, examples of the routing protocols may include, but are not limited to, OSPF, BGP, or RIP etc.

In additional embodiments, the process 500 may assign the encapsulation index based on the host route (block 515). In some embodiments, the encapsulation index may include the one or more attributes such as but not limited to one or more extended community attributes or tunnel encapsulation attributes, etc. for example. In certain embodiments, for example, the tunnel encapsulation attributes can be indicative of one or more of: the ingress point, the egress point, VNI, the address family, or the TLVs etc. In more embodiments, the encapsulation index can be utilized by the network devices for routing one or more data packets associated with the host device through the leaf-spine fabric.

In further embodiments, the process 500 can generate the reachability data based on the encapsulation index (block 520). In some embodiments, the process 500 may generate the extended community attribute based on the reachability data. In more embodiments, the process 500 can generate the NLRI field indicative of the reachability data. In some more embodiments, for example, the reachability data may be indicative of next-hop addresses, route preferences or local preferences, or route types etc. In many more embodiments, for example, the reachability data can be indicative of one or more routing policies, topology, or dynamic changes in the one or more routing policies, topology etc. In many further embodiments, for example, the reachability data may be indicative of withdrawal of one or more previously advertised routes. In still many embodiments, the reachability data can be indicative of advertisement of new routes or addition of new devices to the network.

In many more embodiments, the process 500 may determine the operational status of the interface (block 525). In some embodiments, for example, the operational status may be associated with the host device, the network device and/or the host route etc. In certain embodiments, the operational status can be indicative of whether the host route is active/inactive, reachable/unreachable, or valid/invalid etc. In more embodiments, for example, the operational status may be indicative of change in the operational status of the host device, the network device and/or the host route etc. based on one or more dynamic changes, such as but not limited to changes in network topology, routing policy changes, routing preference changes, network failures, misconfigurations, installing new routes, route convergence, or inconsistencies in the route advertisements etc.

In many additional embodiments, the process 500 can generate the dynamic status data indicative of the operational status of the interface (block 530). In some embodiments, the process 500 may generate another extended community attribute based on the dynamic status data. In more embodiments, the process 500 can generate the NLRI field indicative of the dynamic status data.

In many further embodiments, the process 500 may select a network device (block 535). In some embodiments, the process 500 can store a list of the network devices in the network and select the network device based on the list of the network devices. In certain embodiments, the process 500 can select a neighbor device or a closest network device. In more embodiments, the process 500 may ensure that each network device is selected and that each network device receives the update message.

In still many embodiments, the process 500 can establish the iBGP session with the network device (block 540). In some embodiments, the process 500 can establish multiple iBGP sessions with the network devices connected in the full mesh topology simultaneously and/or sequentially. In certain embodiments, the process 500 can assign and utilize the address family indicative of one or more of: IPv4 address family, IPv6 address family, or an EVPN address family. In more embodiments, the process 500 may establish the iBGP session based on the assigned address family.

In still further embodiments, the process 500 may generate the update message based on at least one of: the reachability data or the dynamic status data (block 545). In some embodiments, the update message can be the BGP update message or the iBGP update message. In certain embodiments, for example, the iBGP update message may include the first and second extended community attributes. In more embodiments, for example, the iBGP update message can include the NLRI field indicative of at least one of: the reachability data or the dynamic status data. In some more embodiments, for example, the iBGP update message can be EVPN Route Type 2 message indicative of the MAC and IP addresses associated with the host device.

In numerous embodiments, the process 500 can transmit the iBGP update message to the network device (block 550). In some embodiments, for example, the process 500 may transmit the iBGP update message upon detecting the change in the operational status of the interface and/or the host device. In certain embodiments, for example, the process 500 can periodically transmit the iBGP update message at predetermined intervals. In more embodiments, the predetermined intervals may be configurable or may vary for different network devices in the leaf-spine fabric.

In many embodiments, the process 500 may check if all the network devices are selected (block 555). In some embodiments, the process 500 can utilize the list of network devices to determine whether all the network devices have received the iBGP update message. In certain embodiments, if at block 550 the process 500 determines that all the network devices are not selected, the process 500 can select another network device from the list of network devices (block 535).

In a number of embodiments, if at block 550 the process 500 determines that all the network devices are selected, the process 500 may update the at least one routing or forwarding table based on the host route (block 560). In some embodiments, for example, the process 500 can store the routing table that may store route information for the network devices and the host devices. In certain embodiments, for example, the process 500 can store the forwarding table that can store port information of the connected network devices and host devices. In some more embodiments, for example, the process 500 can facilitate multiple routing or forwarding tables by way of VRF. In more embodiments, the process 500 may store the route database in the memory. In some more embodiments, the route database can store the routes, the ports, or other routing and/or forwarding information associated with the network devices and host devices. In many more embodiments, the process 500 can determine the route for the host device and update the routing or forwarding table to store the route information.

Although a specific embodiment for the process 500 for generating and transmitting the update message for carrying out the various steps, processes, methods, and operations described herein is discussed with respect to FIG. 5, any of a variety of systems and/or processes may be utilized in accordance with embodiments of the disclosure. For example, the process 500 may utilize one or more different types of messages or signals to advertise the host routes, either: dynamically and/or periodically. The elements depicted in FIG. 5 may also be interchangeable with other elements of FIGS. 1-4 and FIGS. 6-8 as required to realize a particularly desired embodiment.

Referring now to FIG. 6, a flowchart depicting a process 600 for updating the routing and/or forwarding table, in accordance with various embodiments of the disclosure is shown. In many embodiments, the process 600 can establish the communication session with the network device (block 610). In some embodiments, the process 600 may be implemented by one or more network devices. In certain embodiments, the process 600 can establish the communication sessions based on one or more protocols, such as but not limited to, BGP including iBGP and external BGP (cBGP), ECMP, RIP, or OSPF etc. for example. In more embodiments, the network devices may be interconnected in the mesh topology.

In a number of embodiments, the process 600 may receive, from the network device, the update message associated with the host device (block 620). In some embodiments, the update message can be the BGP update message or the iBGP update message. In certain embodiments, the update message can include one or more extended community attributes and/or NLRI fields. In more embodiments, the process 600 can receive multiple update messages, either periodically and/or dynamically.

In various embodiments, the process 600 can extract reachability data from the update message (block 630). In some embodiments, the process 600 may determine one or more of: the MAC and/or IP addresses associated with the host device, the system port associated with the host device, the attachment circuit associated with the host device, or the host route associated with the host device. In certain embodiments, the process 600 can extract the reachability data based on one or more TLV fields in the update message.

In additional embodiments, the process 600 may determine, based on the reachability data, the encapsulation index indicative of the host route associated with the host device (block 640). In some embodiments, the encapsulation index may include the one or more attributes such as but not limited to one or more extended community attributes or tunnel encapsulation attributes, etc. for example. In certain embodiments, for example, the tunnel encapsulation attributes can be indicative of one or more of: the egress point, the ingress point, VNI, the address family, or the one or more TLVs etc. In more embodiments, the encapsulation index can be utilized by the network devices for routing one or more data packets associated with the host device through the leaf-spine fabric.

In further embodiments, the process 600 can update the at least one routing or forwarding table based on the host route (block 650). In some embodiments, for example, the process 600 can store the routing table that may store route information for the network devices and the host devices. In certain embodiments, for example, the process 600 can store the forwarding table that can store port information of the connected network devices and host devices. In some more embodiments, for example, the process 600 can facilitate multiple routing or forwarding tables by way of VRF. In more embodiments, the process 600 may store the route database in the memory. In some more embodiments, the route database can store the routes, the ports, or other routing and/or forwarding information associated with the network devices and host devices. In many more embodiments, the process 600 can determine the route for the host device and update the routing or forwarding table to store the route information.

Although a specific embodiment for the process 600 for updating the routing and/or forwarding table for carrying out the various steps, processes, methods, and operations described herein is discussed with respect to FIG. 6, any of a variety of systems and/or processes may be utilized in accordance with embodiments of the disclosure. For example, the process 600 may dynamically update the routing and forwarding tables based on changes in the routes or prefixes. The elements depicted in FIG. 6 may also be interchangeable with other elements of FIGS. 1-5 and FIGS. 7-8 as required to realize a particularly desired embodiment.

Referring now to FIG. 7, a flowchart depicting a process 700 for routing one or more data packets, in accordance with various embodiments of the disclosure is shown. In many embodiments, the process 700 can receive the data packet (block 705). In some embodiments, the process 700 can be implemented by the network device. In certain embodiments, the process 700 may receive the data packet from a source host device. In more embodiments, for example, the data packet may include the destination MAC address, the destination IP address, the source MAC address, the source IP address, and data.

In a number of embodiments, the process 700 can determine that the data packet is associated with the source host device (block 710). In some embodiments, the process 700 may be implemented by the network device that functions as the default gateway for the source host device. In certain embodiments, the process 700 can be implemented by the network device that is directly connected to the source host device.

In various embodiments, the process 700 may determine the host route and the interface associated with a destination host device (block 715). In some embodiments, the process 700 may utilize the routing and forwarding table to determine a destination system port, a destination network, or a destination attachment circuit etc. for routing the data packet. In certain embodiments, the process 700 can determine the interface associated with the destination host device. In more embodiments, the process 700 may determine the encapsulation index associated with the host route.

In additional embodiments, the process 700 can encapsulate the data packet based on the encapsulation index (block 720). In some embodiments, the process 700 may generate the packet context data associated with the data packet. In certain embodiments, the process 700 can generate a header indicative of the MAC and/or IP addresses of the destination host device or the next-hop interface.

In further embodiments, the process 700 may buffer the encapsulated data packet in the VOQ associated with the interface (block 725). In some embodiments, for example, the process 700 can map the data packet or the encapsulated data packet to the VOQ based on the type of the data packet or one or more classifiers associated with the data packet. In certain embodiments, the process 700 may classify the data packet based on the protocol type, source and/or destination IP addresses, source and/or destination port numbers, or any other attributes defined by network policies etc. for example. In more embodiments, each VOQ may be associated with the specific system port or interface. In some more embodiments, the mapping of the data packet to the one or more VOQs can be based on one or more classification rules configured in the forwarding logic.

In many more embodiments, the process 700 may transmit the grant request to the network device based on the operational status of the interface (block 730). In some embodiments, the grant request may be indicative of requesting credit to ensure that the OQs have sufficient buffer space to store the data packet. In certain embodiments, the credit mechanism can help in preventing congestion and ensuring that the destination interface can handle traffic bursts without dropping packets.

In many additional embodiments, the process 700 can receive the grant response from the network device (block 735). In some embodiments, if the sufficient credit is granted by the destination network device, the data packet and the traffic from the VOQs may be forwarded over the leaf-spine fabric to the corresponding OQs for transmission. In certain embodiments, the destination network device may grant the credit if the destination network device is actively capable of handling the traffic transmitted by the process 700.

In further embodiments, the process 700 may route the encapsulated data packet from the VOQ to the destination network device (block 740). In some embodiments, the process 700 can distribute the encapsulated data packets and the corresponding packet context data across multiple fabric links. In certain embodiments, each fabric link may be assigned the weight, which can determine the share of the traffic. In more embodiments, higher-weighted fabric links can receive more share of the traffic compared to lower-weighted fabric links. In some more embodiments, the round-robin technique may ensure that the traffic is evenly distributed among the fabric links.

In many more embodiments, the process 700 can check if there are more data packets received from the source host device (block 745). In some embodiments, the source host device can transmit a data stream including a plurality of data packets. In certain embodiments, the process 700 can separately route each data packet of the data stream. If at block 745 the process 700 determines that there are more data packets, the process 700 can receive next data packet (block 745). In some embodiments, the process 700 may repeat the blocks 705-740 for each data packet of the data stream.

Although a specific embodiment for the process 700 for routing the one or more data packets for carrying out the various steps, processes, methods, and operations described herein is discussed with respect to FIG. 7, any of a variety of systems and/or processes may be utilized in accordance with embodiments of the disclosure. For example, the process 700 may route the data packets through the DSF. The elements depicted in FIG. 7 may also be interchangeable with other elements of FIGS. 1-6 and FIG. 8 as required to realize a particularly desired embodiment.

Figure 8:
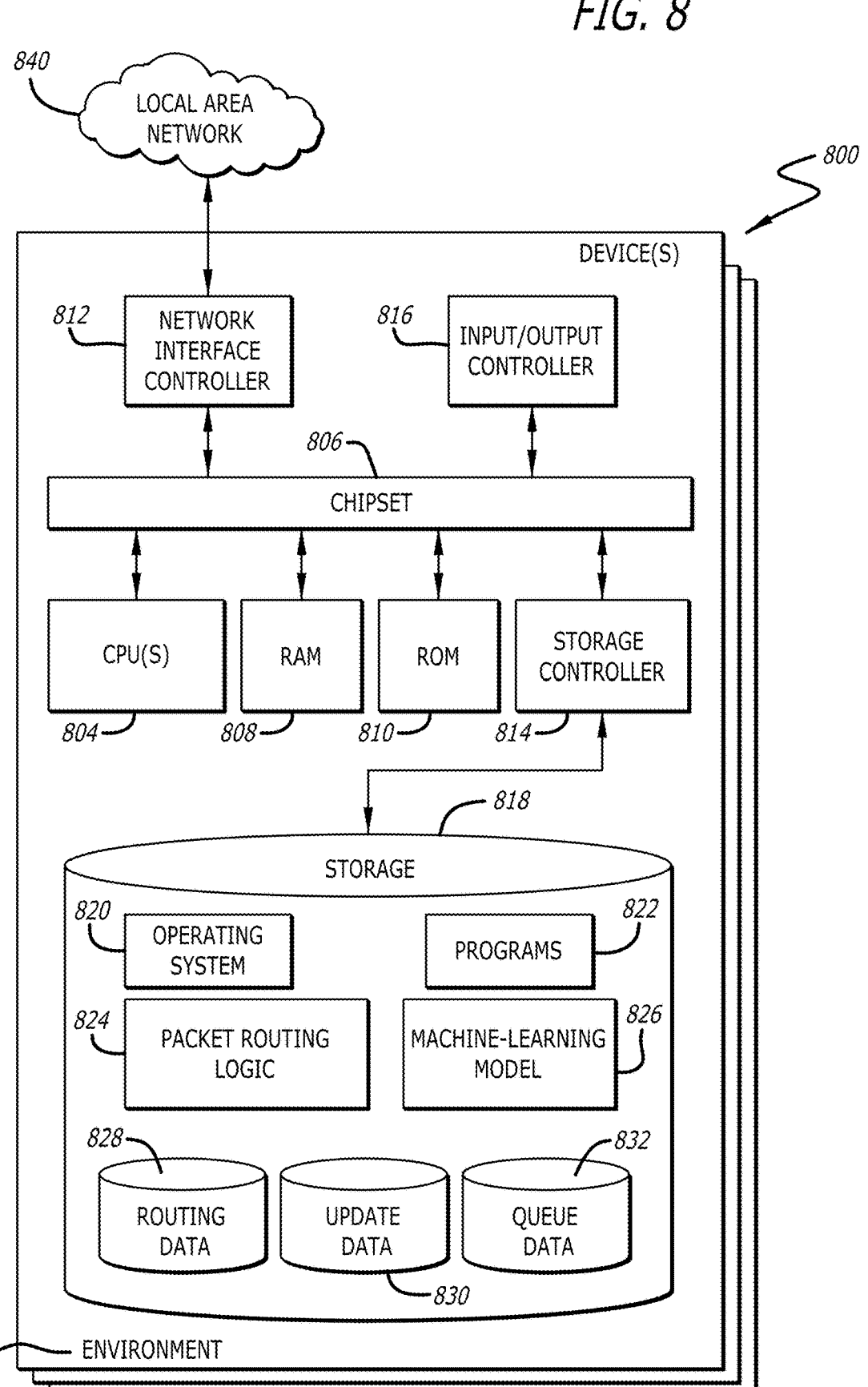
FIG. 8 is a conceptual block diagram of a device suitable for configuration with a packet routing logic, in accordance with various embodiments of the disclosure.

Referring to FIG. 8, a conceptual block diagram of a device 800 suitable for configuration with a packet routing logic, in accordance with various embodiments of the disclosure is shown. The embodiment of the conceptual block diagram depicted in FIG. 8 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 8 can also illustrate an access point, a switch, or a router in accordance with various embodiments of the disclosure. The device 800 may, in many non-limiting examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In a number of embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Additional embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for instance, store an operating system 820, applications 822, routing data 828, update data 830, and queue data 832 which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The routing data 828 can store one or more of: the routing or forwarding tables, reachability data, dynamic status data, the update messages including the BGP update messages and the iBGP update messages, NLRI fields, the extended community attributes, the encapsulation indexes, the source and/or destination addresses, MAC tables, or interface information etc., for example. The update data 830 can store one or more of: the iBGP updates messages or keepalive messages etc., for example. The queue data 832 may store the VOQs, the encapsulated data packets, or the data stream etc., for example.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

In many more embodiments, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In many additional embodiments, the storage 818 or other computer-readable storage media is encoded with computer-executable instructions which, when loaded into the device

800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In certain embodiments, the device 800 can also include computer-readable storage media having instructions stored thereupon for performing any of the other computer-implemented operations described herein.

In many further embodiments, the device 800 may include a packet routing logic 824. The packet routing logic 824 can be configured to perform one or more of the various steps, processes, operations, and/or other methods that are described above. Often, the packet routing logic 824 can be a set of instructions stored within a non-volatile memory that, when executed by the processor(s)/controller(s) 804 can carry out these steps, etc. In some embodiments, the packet routing logic 824 may be a client application that resides on a network-connected device, such as, but not limited to, a server, switch, personal or mobile computing device in a single or distributed arrangement. The packet routing logic 824 may route the data packets over the leaf-spine fabric such as but not limited to the DSF.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

Finally, in numerous additional embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826.

The ML model(s) 826 can be configured to generate inferences to make predictions or draw conclusions from data. An inference can be considered the output of a process of applying a model to new data. This can occur by learning from at least the routing data 828, the update data 830, and the queue data 832 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 826 may be generated by human/administrator verifications or may compare predicted outcomes with actual outcomes.

Although a specific embodiment for the device 800 suitable for configuration with the packet routing logic for carrying out the various steps, processes, methods, and operations described herein is discussed with respect to FIG. 8, any of a variety of systems and/or processes may be utilized in accordance with embodiments of the disclosure. For example, the device 800 may be in a virtual environment such as a cloud-based network administration suite, or it may be distributed across a variety of network devices or switches. The elements depicted in FIG. 8 may also be interchangeable with other elements of FIGS. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor; and a packet routing logic, configured to:

identify an interface associated with a host device;

determine a host route based on the interface;

determine whether all of the network devices are selected by utilizing the list of the network devices to verify that each of the network devices has received an internal Border Gateway Protocol (iBGP) update message;

upon determining that all the network devices are selected, updating at least one routing or forwarding table based on the host route;

assign an encapsulation index based on the host route; and generate reachability data based on the encapsulation index.

2. The device of claim 1, wherein the interface comprises one or more of:

a Media Access Control (MAC) address associated with the host device;

an Internet Protocol (IP) address associated with the host device;

a system port connected to the host device; or an attachment circuit associated with the host device.

3. The device of claim 2, wherein the packet routing logic is further configured to:

determine an operational status of the interface; and generate dynamic status data indicative of the operational status of the interface.

4. The device of claim 3, wherein the packet routing logic is further configured to:

establish one or more internal Border Gateway Protocol (iBGP) sessions with one or more network devices;

generate an iBGP message based on at least one of: the reachability data or the dynamic status data; and transmit the iBGP message to the one or more network devices.

5. The device of claim 4, wherein the packet routing logic is further configured to:

generate one or more extended community attributes indicative of at least one of: the reachability data or the dynamic status data, and wherein the iBGP message comprises the one or more extended community attributes.

6. The device of claim 4, wherein the iBGP message comprises a Network Layer Reachability Information (NLRI) field indicative of at least one of: the reachability data or the dynamic status data.

7. The device of claim 4, wherein the iBGP message is an Ethernet Virtual Private Network (EVPN) Route Type 2 message indicative of the MAC and IP addresses associated with the host device.

8. The device of claim 4, wherein the packet routing logic is further configured to:

assign an address family indicative of one or more of: an IP version 4 (IPv4) address family, an IP version 6 (IPv6) address family, or an EVPN address family, and wherein the iBGP message is transmitted based on the assigned address family.

9. The device of claim 4, wherein the host route is one or more of: a directly connected route, a static route, or an iBGP route.

10. The device of claim 1, wherein the packet routing logic is further configured to:

store at least one routing or forwarding table in the memory; and update the at least one routing or forwarding table based on the host route.

11. A device, comprising:

a processor;

a memory communicatively coupled to the processor; and a packet routing logic, configured to:

establish a communication session with a network device;

receive, from the network device, an update message associated with a host device;

determine whether all of the network devices are selected by utilizing the list of the network devices to verify that each of the network devices has received an internal border gateway protocol (iBGP) update message;

upon determining that all the network devices are selected, updating at least one routing or forwarding table based on the host route;

extract reachability data from the update message; and determine, based on the reachability data, an encapsulation index indicative of a host route associated with the host device.

12. The device of claim 11, wherein the packet routing logic is further configured to determine, based on the reachability data, an interface comprising one or more of:

a Media Access Control address associated with the host device;

an Internet Protocol address associated with the host device;

a system port connected to the host device; or an attachment circuit associated with the host device.

13. The device of claim 12, wherein the packet routing logic is further configured to:

store at least one routing or forwarding table in the memory; and update the at least one routing or forwarding table based on the host route.

14. The device of claim 13, wherein the packet routing logic is further configured to extract, from the update message, dynamic status data indicative of an operational status of the interface.

15. The device of claim 14, wherein the packet routing logic is further configured to:

receive a data packet;

determine that the data packet is associated with the host device;

determine, based on the at least one routing or forwarding table, the host route and the interface associated with the host device; and encapsulate the data packet based on the encapsulation index associated with the host route to generate an encapsulated data packet.

16. The device of claim 15, wherein the packet routing logic is further configured to:

buffer the encapsulated data packet in a virtual output queue associated with the interface;

transmit a grant request to the network device based on the operational status of the interface;

receive a grant response from the network device; and route the encapsulated data packet from the virtual output queue to the network device based on the grant response.

17. The device of claim 14, wherein the communication session is an internal Border Gateway Protocol (iBGP) session and the update message is an iBGP update message.

18. A method, comprising:

identifying an interface associated with a host device;

determining a host route based on the interface;

assigning an encapsulation index based on the host route;

generating reachability data based on the encapsulation index;

determining an operational status of the interface; and generating an update message indicative of the encapsulation index and the operational status;

utilizing a list of network devices to determine whether all of the network devices are selected;

verifying that each of the network devices has received an internal border gateway protocol (iBGP) update message; and upon determining that all the network devices are selected, updating at least one routing or forwarding table based on the host route.

19. The method of claim 18, wherein the interface comprises one or more of:

a Media Access Control address associated with the host device;

an Internet Protocol (IP) address associated with the host device;

a system port connected to the host device; or an attachment circuit associated with the host device.

20. The method of claim 19, comprising: establishing one or more internal Border Gateway Protocol sessions with one or more network devices; assigning an address family indicative of one or more of: an IP version 4 address family, an IP version 6 address family, or an Ethernet Virtual Private Network address family; and transmitting the update message to the one or more network devices based on the assigned address family.

\* \* \* \* \*